United States Patent
Mercer et al.

(10) Patent No.: US 7,322,278 B2
(45) Date of Patent: Jan. 29, 2008

(54) FRYERS WHICH DEACTIVATE BEFORE A LEVEL OF A COOKING MEDIUM FALLS BELOW A MINIMUM LEVEL, AND METHODS OF DEACTIVATING SUCH FRYERS

(75) Inventors: Gary L. Mercer, Eaton, OH (US); Ned M. Mote, Laura, OH (US); Douglas A. Burkett, Eaton, OH (US)

(73) Assignee: Henny Penny Corporation, Eaton, OH (US)

( * ) Notice: Subject to any disclaimer, the term of this patent is extended or adjusted under 35 U.S.C. 154(b) by 390 days.

(21) Appl. No.: 10/730,066

(22) Filed: Dec. 9, 2003

(65) Prior Publication Data

US 2004/0112225 A1 Jun. 17, 2004

Related U.S. Application Data

(60) Provisional application No. 60/432,254, filed on Dec. 11, 2002.

(51) Int. Cl.
*A47J 37/12* (2006.01)
(52) U.S. Cl. ............................. 99/333; 99/331; 99/338; 99/403
(58) Field of Classification Search ............... 99/331, 99/333, 338, 337, 403, 330; 426/438, 520, 426/523
See application file for complete search history.

(56) References Cited

U.S. PATENT DOCUMENTS

| | | | |
|---|---|---|---|
| 1,990,351 A | 2/1935 | Shroyer | |
| 3,159,344 A | 12/1964 | Wilson | |
| 4,032,749 A | 6/1977 | Price | |
| 4,058,703 A | 11/1977 | Price | |
| 4,197,581 A | 4/1980 | Watrous et al. | |
| 4,210,177 A | 7/1980 | Moore et al. | |
| 4,277,773 A | 7/1981 | Blatnik | |
| 4,282,423 A | 8/1981 | Volz | |
| 4,296,310 A | 10/1981 | Luebke et al. | |

(Continued)

FOREIGN PATENT DOCUMENTS

SU 961161 9/1982

*Primary Examiner*—Reginald L. Alexander
(74) *Attorney, Agent, or Firm*—Baker Botts L.L.P.

(57) ABSTRACT

A fryer includes a cooking vessel, and the cooking vessel includes a wall and contains a cooking medium. The fryer also includes a heater for heating the cooking medium, and a first temperature sensor which determines a first temperature. The first temperature is a temperature of the cooking medium or is a temperature of air within the cooking vessel, depending on a level of the cooking medium within the cooking vessel. The first temperature sensor also generates a first signal indicating the first temperature. The fryer also includes a second temperature sensor, which determines a second temperature of the wall. The second temperature sensor also generates a second signal indicating the second temperature. Moreover, the fryer includes a controller which is electrically coupled to the first temperature sensor and to the second temperature sensor. Specifically, the controller receives the first signal and receives the second signal. The controller also deactivates the heater when the second temperature is greater than or equal to a particular predetermined temperature, or when a difference between the second temperature and the first temperature is greater than or equal to a predetermined temperature difference, or both.

22 Claims, 5 Drawing Sheets

U.S. PATENT DOCUMENTS

| | | |
|---|---|---|
| 4,320,285 A | 3/1982 | Koether |
| 4,372,980 A | 2/1983 | Luebke et al. |
| 4,420,006 A | 12/1983 | Moore et al. |
| 4,539,898 A * | 9/1985 | Bishop et al. ................ 99/336 |
| 4,665,391 A | 5/1987 | Spani |
| 4,908,783 A | 3/1990 | Maier |
| 4,913,038 A | 4/1990 | Burkett et al. |
| 4,948,950 A | 8/1990 | Rae |
| 4,987,776 A | 1/1991 | Koon |
| 5,051,921 A | 9/1991 | Paglione |
| 5,103,801 A | 4/1992 | Herring et al. |
| 5,157,453 A | 10/1992 | Suzuki et al. |
| 5,161,411 A | 11/1992 | Cruickshank |
| 5,186,097 A | 2/1993 | Vaseloff et al. |
| 5,232,151 A | 8/1993 | Mercer et al. |
| 5,253,521 A | 10/1993 | Abramovich et al. |
| 5,545,877 A | 8/1996 | Shelton |
| 5,582,755 A | 12/1996 | Maher, Jr. et al. |
| 5,586,486 A * | 12/1996 | Nitschke et al. ............... 99/330 |
| 5,598,767 A | 2/1997 | Minari et al. |
| 5,613,423 A * | 3/1997 | Polster ........................ 99/330 |
| 5,776,530 A * | 7/1998 | Davis et al. ................ 426/233 |
| 5,910,206 A * | 6/1999 | McNamara .................. 99/330 |
| 5,942,269 A | 8/1999 | Casey et al. |
| 6,057,772 A | 5/2000 | Burkett |
| 6,132,782 A | 10/2000 | Burkett et al. |
| 6,274,850 B1 | 8/2001 | Mercer et al. |
| 6,427,580 B1 * | 8/2002 | Benedictus et al. ........... 99/330 |
| 6,958,166 B2 * | 10/2005 | Taylor ........................ 426/233 |
| 2003/0047084 A1 * | 3/2003 | Shandross .................... 99/330 |

\* cited by examiner

FRYERS WHICH DEACTIVATE BEFORE A LEVEL OF A COOKING MEDIUM FALLS BELOW A MINIMUM LEVEL, AND METHODS OF DEACTIVATING SUCH FRYERS

The present invention claims priority from U.S. Provisional Patent Application No. 60/432,254, which is entitled "Fryers Which Deactivate Before a Level of a Cooking Medium Falls Below a Minimum Level, and Methods of Deactivating Such Fryers," and was filed on Dec. 11, 2002, the disclosure of which is incorporated herein by reference.

BACKGROUND OF THE INVENTION

1. Field of the Invention

The present invention relates generally to fryers and methods of using such fryers. In particular, the present invention is directed to fryers which deactivate before a level of a cooking medium in the fryer falls below a minimum level, and methods of deactivating such fryers.

2. Description of Related Art

Known fryers, e.g., open-well fryers and pressure fryers, are used to cook various food products, e.g., poultry, fish, or potato products. Such fryers include a cooking vessel, e.g., a fry pot, and the cooking vessel is filled with a cooking medium, e.g., an oil, a liquid shortening, a meltable-solid shortening, or water. Such fryers also include a heating element, e.g., an electrical heating element, such as a plurality of heating coils, or a gas heating element, such as a gas burner and gas conveying tubes, which heat the cooking medium in the cooking vessel. After the cooking medium reaches a preset temperature (herein after referred to as the "cooking temperature"), the food product is placed into the cooking medium, such that the food product is cooked in the cooking medium. For example, the food product may be positioned inside a container, e.g., a wire basket, and submerged in the cooking medium for a predetermined amount of time sufficient to cook the food product. The amount of time sufficient to cook the food product at a given cooking temperature depends on the type of food product which is cooked. Moreover, the cooking medium is used during several cooking cycles before the cooking medium inside the cooking vessel is replaced or is supplemented with a new or filtered supply of cooking medium.

When the same cooking medium is used during several cooking cycles, a level of the cooking medium inside the cooking vessel gradually decreases. For example, a portion of the cooking medium may evaporate or may be absorbed by the food product. The level of the cooking medium inside the cooking vessel is an important factor in the efficiency of the fryer. For example, when the level of the cooking medium is too high, placing the food product inside the cooking vessel may cause the cooking medium to overflow or to boil over the walls of the cooking vessel. Moreover, when the level of the cooking medium is too low, or if the cooking vessel is empty, the heating element may overheat the cooking vessel, which damages the fryer or reduces the efficiency of the fryer, or both.

In order to monitor the level of the cooking medium inside the cooking vessel, such known fryers include an apparatus which senses the level of the cooking medium. For example, in such known fryers, a plurality of fluid level sensors, e.g., float switches, capacitive level sensors, proximity switches, pressure switches, strain gauges, or optical refractive sensors, may be affixed to an interior surface of the cooking vessel at various levels within the cooking vessel. As such, each fluid level sensor is positioned at a predetermined level within the cooking vessel and determines whether cooking medium is present at that particular level.

Such known fryers also include a controller which is electrically coupled to each of the fluid level sensors, and the controller deactivates the heating element of the fryer based on the level of the cooking medium inside the cooking vessel. The controller also may implement one of several control modes. For example, the controller may implement a first control mode when the fryer is cooking the food product, and a second control mode when the temperature of the cooking medium is greater than or equal to the cooking temperature, but the fryer is not cooking the food product. The controller also may implement a third control mode when a user is cleaning the fryer, and a fourth or an idle control mode to maintain the temperature of the cooking medium between the cooking temperature and a temperature of air within the cooking vessel. For example, the controller may apply the idle control mode when the fryer is not in continuous use, but customer demand for the food product may increase without desired or sufficient notice to the user of the fryer. Moreover, the controller may implement a fifth or a melt control mode when the temperature of the cooking medium is relatively cold, e.g., when a difference between the temperature of the cooking medium and the temperature of air within the cooking vessel is less than or equal to a predetermined temperature difference. The purpose of the melt control mode is to heat the cooking medium without burning the cooking medium, and to protect the cooking vessel by limiting the amount of heat which the heating element applies to the cooking medium, e.g., by discretely or non-continuously applying heat to the cooking medium, or by gradually increasing the heat applied to cooking medium.

Nevertheless, such fluid level sensors are relatively expensive, which increases the cost of manufacturing the fryer. Further, when such fluid level sensors are submerged in a cooking medium at the cooking temperature, the fluid level sensor may become inaccurate or unreliable. Moreover, using the melt control mode when the temperature of the cooking medium is significantly below the cooking temperature may increase an amount of time to raise the temperature of the cooking medium to the cooking temperature. The melt control mode also may increase the number of control modes which the user of the fryer selects from when operating the fryer.

SUMMARY OF THE INVENTION

Therefore, a need has arisen for a fryer which overcomes these and other shortcomings of the related art. A technical advantage of the present invention is that a fryer may determine the level of the cooking medium inside the cooking vessel without using fluid level sensors. For example, temperature sensors may used to determine the temperature of the cooking medium or the temperature of a wall of the cooking vessel, or both, in order to determine, e.g., indirectly determine, the level of the cooking medium. Another technical advantage of the present invention is that the fryer may deactivate before the level of the cooking medium falls below a minimum level without using a melt control mode, which reduces the number of control modes which the user selects from when operating the fryer.

According to an embodiment of the present invention, a fryer comprises a cooking vessel, and the cooking vessel comprises at least one wall and contains a cooking medium. The fryer also comprises means for heating the cooking medium, e.g., a heater, such as an electrical heating element or a gas heating element, and a first temperature sensor which is adapted to determine a first temperature. The first temperature may be a temperature of the cooking medium or a temperature of air within the cooking vessel, depending on a level of the cooking medium inside the cooking vessel. The first temperature sensor also generates a first signal indicating the first temperature. The fryer also comprises a second temperature sensor, which is adapted to determine a second temperature of the at least one wall. The second temperature sensor also generates a second signal indicating the second temperature. Moreover, the fryer comprises a controller which is electrically coupled to the first temperature sensor and to the second temperature sensor. Specifically, the controller is adapted to receive the first signal and receives the second signal. The controller also is adapted to deactivate the means for heating when at least one predetermined condition is satisfied. Moreover, the at least one predetermined condition is (1) when the second temperature is greater than or equal to a particular predetermined temperature, or (2) when a difference between the second temperature and the first temperature is greater than or equal to a predetermined temperature difference, or both.

According to another embodiment of the present invention, a fryer comprises a cooking vessel, and the cooking vessel comprises at least one wall and contains a cooking medium. The fryer also comprises means for heating the cooking medium, e.g., a heater, such as an electrical heating element or a gas heating element. The fryer also comprises a temperature sensor, which is adapted to determine a temperature of the at least one wall. Moreover, the fryer comprises a controller which is electrically coupled to the temperature sensor. Specifically, the controller is adapted to deactivate the means for heating when the temperature of the at least one wall is greater than or equal to a predetermined temperature.

According to yet another embodiment of the present invention, a method of deactivating a fryer when a level of a cooking medium in the fryer falls below a predetermined level, is described. The fryer comprises a cooking vessel which is adapted to contain the cooking medium, and the cooking vessel comprises at least one wall. The fryer also comprises means for heating the cooking medium, e.g., a heater, such as an electrical heating element or a gas heating element. The method comprises the step of determining a first temperature. The first temperature is a temperature of the cooking medium or a temperature of air within the cooking vessel, depending on a level of the cooking medium inside the cooking vessel. The method also comprises the steps of determining a second temperature of the at least one wall, and deactivating the means for heating the cooking medium when at least one predetermined condition is satisfied. Moreover, the at least one predetermined condition occurs (1) when the second temperature is greater than or equal to a particular predetermined temperature, or (2) when a difference between the second temperature and the first temperature is greater than or equal to a predetermined temperature difference, or both.

Other objects, features, and advantages of the present invention will be apparent to persons of ordinary skill in the art in view of the foregoing detailed description of the invention and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

DESCRIPTION OF PREFERRED EMBODIMENTS

Preferred embodiments of the present invention, and their features and advantages, may be understood by referring to FIGS. 1-6, like numerals being used for corresponding parts in the various drawings.

Figure 1:
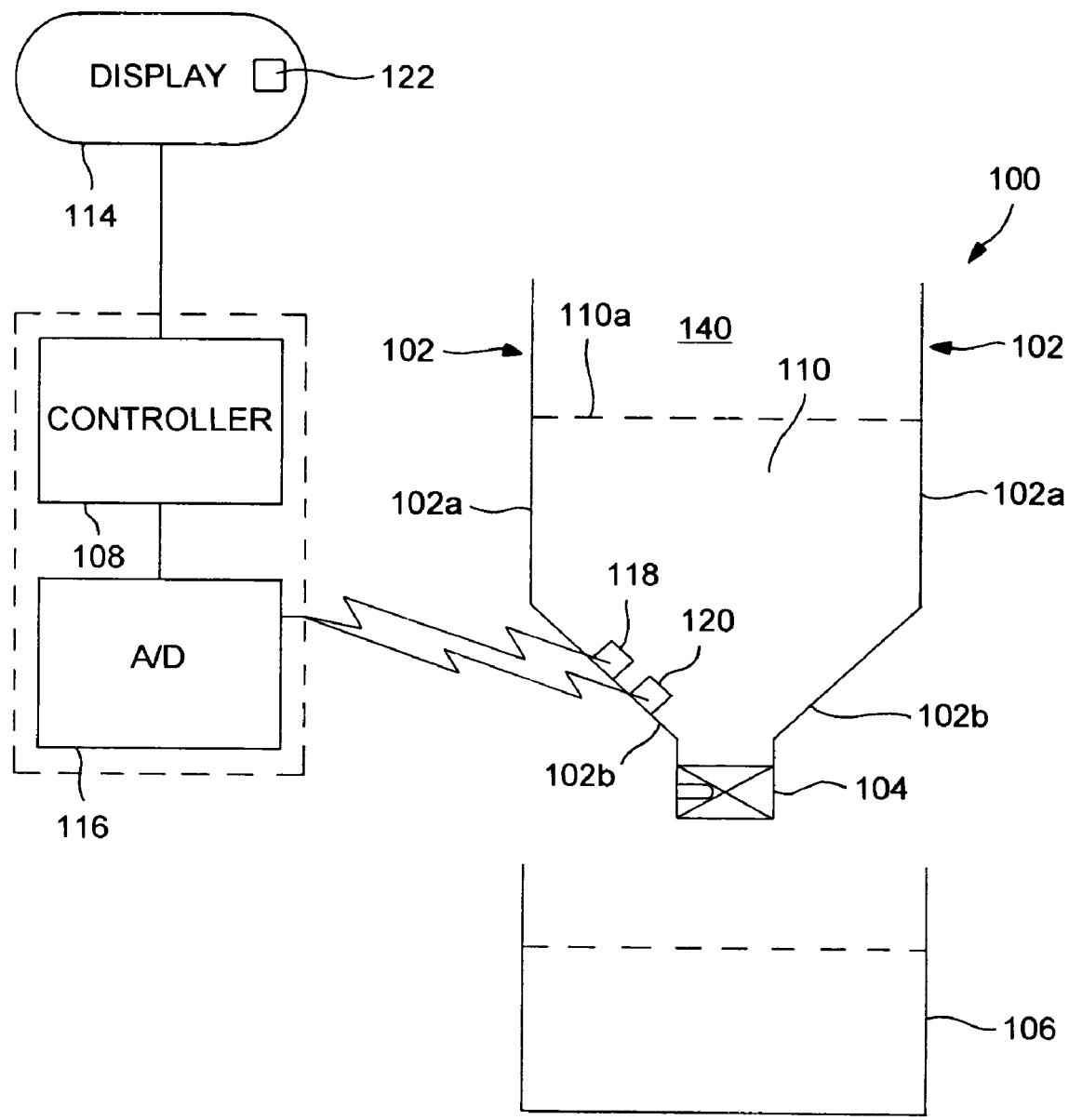
FIG. 1 is a fryer containing a cooking medium at a first level, according to an embodiment of the present invention.
Figure 2:
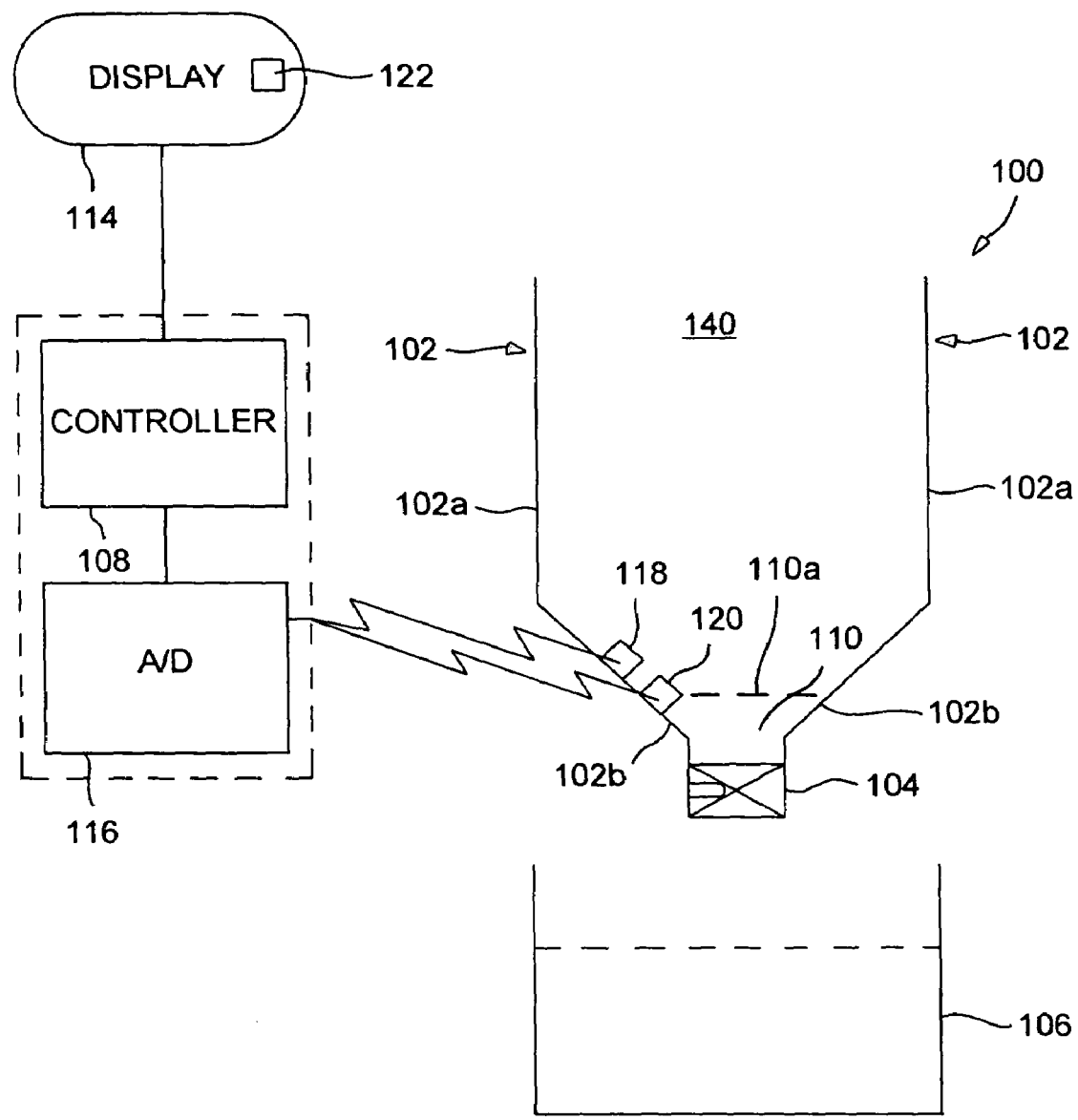
FIG. 2 is a fryer containing a cooking medium at a second level, according to an embodiment of the present invention.
Figure 3:
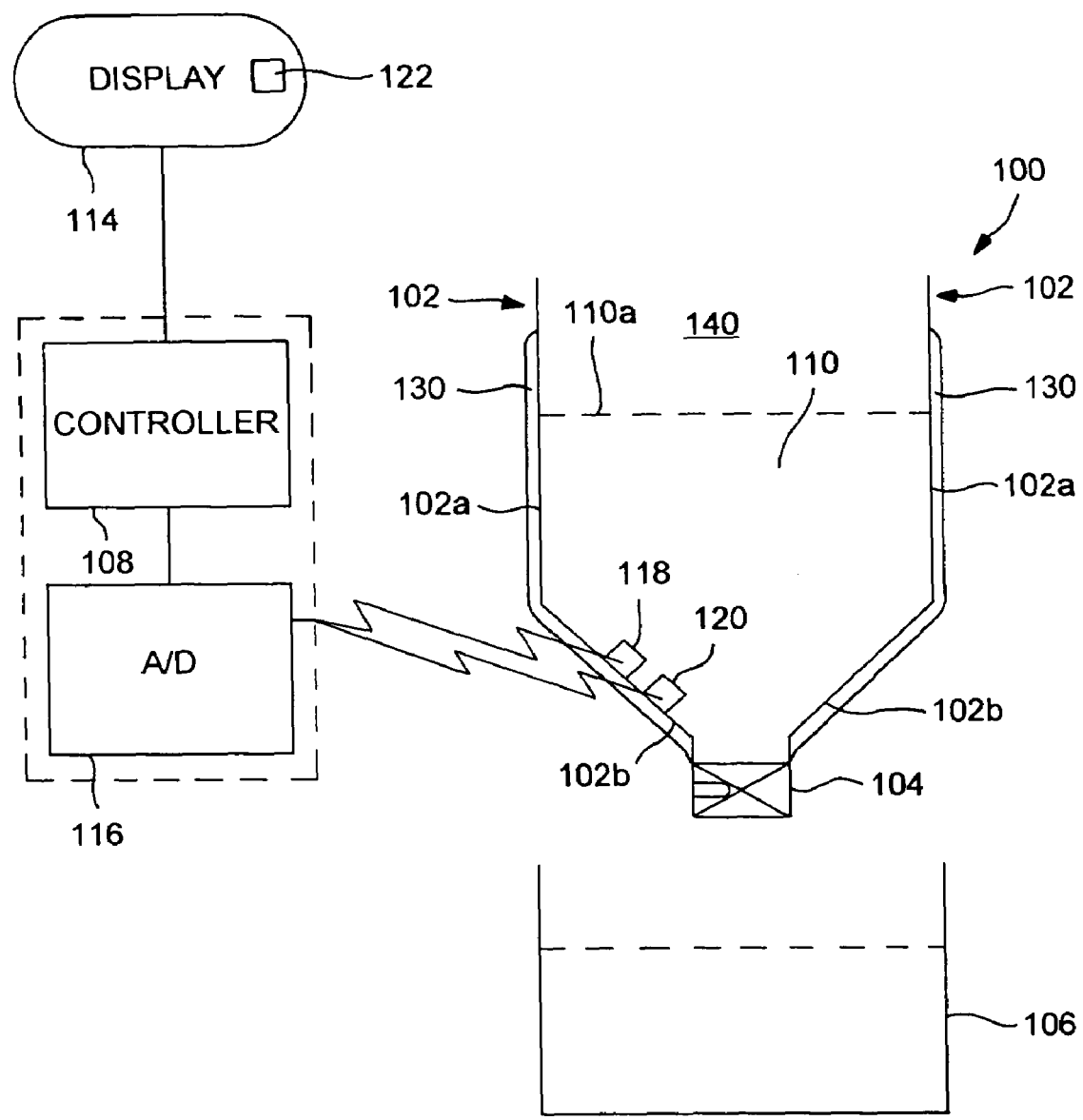
FIG. 3 is a fryer with heating elements positioned on an exterior surface of the fryer, according to another embodiment of the present invention.
Figure 4:
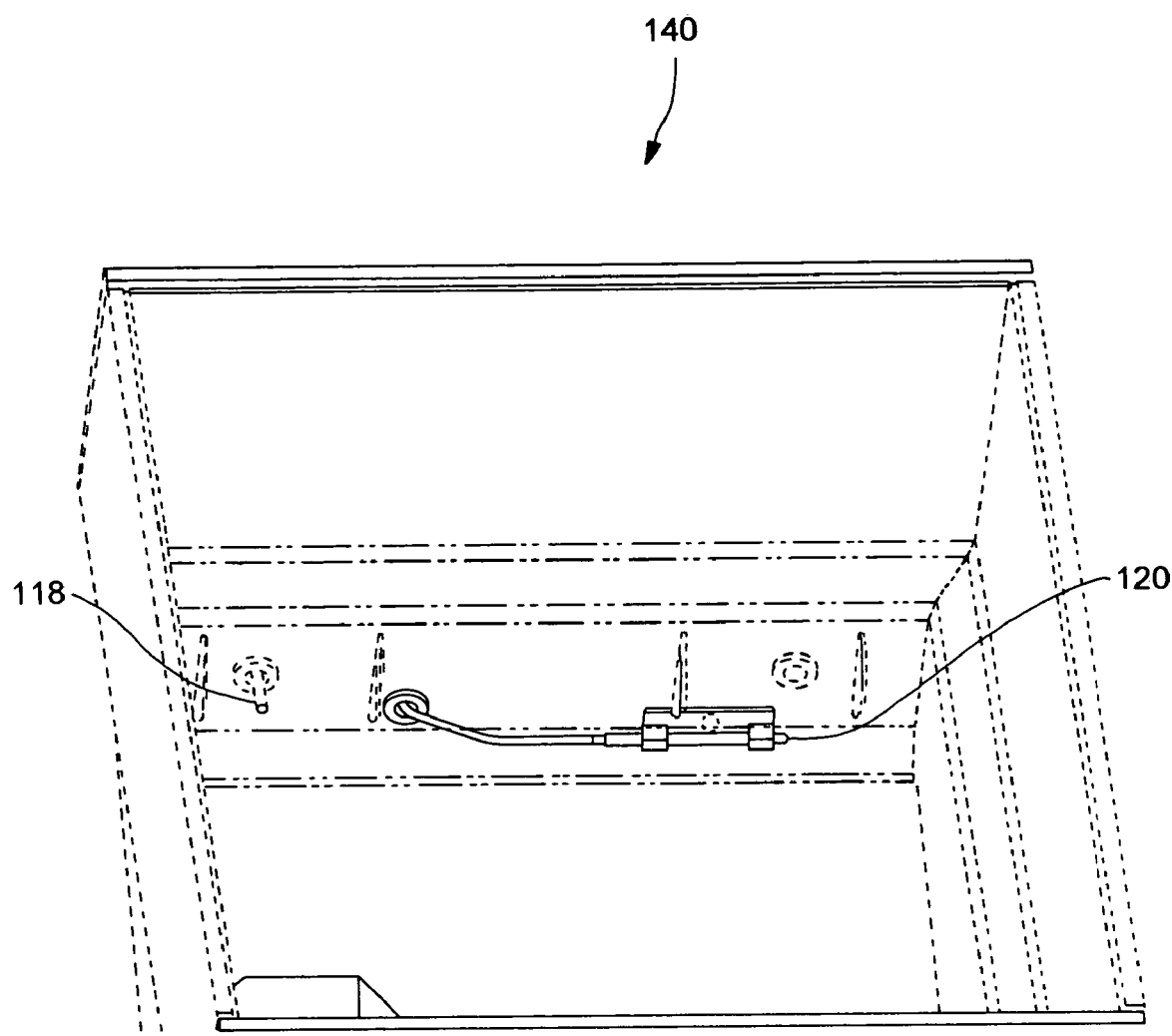
FIG. 4 is a perspective view depicting an interior of a cooking vessel of the fryer, according to an embodiment of the present invention
Figure 5:
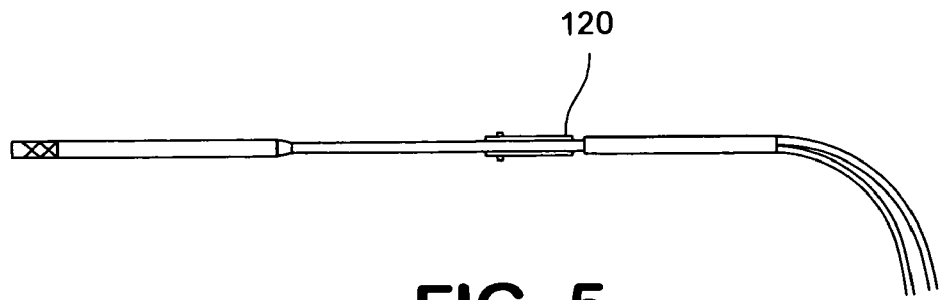
FIG. 5 is a side view of a temperature sensor which is adapted to determine a temperature of a wall of the cooking vessel of FIG. 4, according to an embodiment of the present invention

Referring to FIGS. 1-5, a fryer 100, e.g., an open-well fryer, a pressure fryer, or the like, according to an embodiment of the present invention is depicted. Fryer 100 may be used to cook various food products, e.g., poultry, fish, potato products, or the like. The food product may be an uncooked food product, a partially cooked food product, or a precooked food product. Fryer 100 may comprise a cooking vessel 140, e.g., a fry pot, and cooking vessel 140 may be adapted to contain a cooking medium 110, e.g., an oil, a liquid shortening, a meltable-solid shortening, water, or the like. Cooking vessel 140 may comprise at least one wall 102, e.g., a pair of walls, and the at least one wall 102 may comprise an upper portion 102a and a lower portion 102b. In an embodiment, a plane including lower portion 102b may be slanted relative to a plane including upper portion 102a. Fryer 100 also may comprise means for heating cooking medium 110. For example, the means for heating cooking medium 110 may comprise a heater 130, e.g., an electrical heating element, such as a plurality of heating coils, a gas heating element, such as a gas burner and gas conveying tubes, or the like. Heater 130 may be positioned within cooking vessel 140. Referring specifically to FIG. 3, in a modification of this embodiment, heater 130 may be positioned outside cooking vessel 140, e.g., may be positioned on an exterior surface of the at least one wall 102. Fryer 100 further may comprise a drain pan 106, and drain pan 106 may be adapted to receive cooking medium 110 from cooking vessel 140 when a drain valve 104 is in an open position. For example, cooking medium 110 may be used during several cooking cycles, and after a predetermined number of cooking cycles, a user of fryer 100 may open drain valve 104 to replace at least a portion of cooking medium 110 currently inside cooking vessel 140 with a new or filtered cooking medium.

Fryer 100 also may comprise a first temperature sensor 118. First temperature sensor 118 may be affixed to the at least one wall 102 of cooking vessel 140, e.g., may be affixed to lower portion 102b of the at least one wall 102.

First temperature sensor 118 may be adapted to determine a first temperature, e.g., may be adapted to detect or to receive data associated with the first temperature. The first temperature may be a temperature of cooking medium 110, or may be a temperature of air within cooking vessel 140. Specifically, when a level 110a of cooking medium 110 is above or is substantially even with first temperature sensor 118, first temperature sensor 118 may determine the temperature of cooking medium 110. Nevertheless, when level 110a of cooking medium 110 falls below first temperature sensor 118, first temperature sensor 118 may determine the temperature of the air within cooking vessel 140. Moreover, when the temperature of cooking medium 110 is greater than the temperature of the air within cooking vessel 140, and level 110a of cooking medium 110 falls below first temperature sensor 118, the temperature determined by first temperature sensor 118 may be less than the temperature determined by first temperature sensor 118 when level 110a of cooking medium 110 is above or is substantially even with first temperature sensor 118.

Fryer 100 also may comprise a second temperature sensor 120. Second temperature sensor 120 may be affixed to the at least one wall 102 of cooking vessel 140, e.g., may be affixed to lower portion 102b of the at least one wall 102. For example, second temperature sensor 120 may be affixed to the at least one wall 102, and may be positioned below first temperature sensor 118. In a modification of this embodiment, second temperature sensor 120 may be affixed to heater 130 when heater 130 is positioned outside cooking vessel 140. Second temperature sensor 120 may be adapted to determine a second temperature of the at least one wall 102, e.g., may be adapted to detect or to receive data associated with the second temperature of the at least one wall 102. Moreover, when level 110a of cooking medium 110 falls below second temperature sensor 120, the temperature determined by second temperature sensor 120 may be greater than the temperature determined by second temperature sensor 120 when level 110a of cooking medium 110 is above or is substantially even with second temperature sensor 120. For example, cooking medium 110 may decrease the temperature of the at least one wall 102, and as level 110a of cooking medium 110 is lowered, heat more readily may be transferred to the at least one wall 102.

Fryer 100 also may comprise a controller 108 and an analog to digital converter 116. Analog to digital converter 116 may be electrically coupled to controller 108, first temperature sensor 118, and second temperature sensor 120. As such, controller 108 may be electrically coupled to first temperature sensor 118 and second temperature sensor 120 via analog to digital converter 116. For example, first temperature sensor 118 and second temperature sensor 120 may be adapted to generate a first signal and a second signal indicating the first temperature and the second temperature, respectively, and controller 108 may be adapted to receive the first signal and the second signal. Controller 108 also may be adapted to compare the first signal to the second signal, and to determine a temperature difference between the second temperature and the first temperature based on the second signal and the first signal. Moreover, controller 108 may be adapted to deactivate heater 130 when at least one predetermined condition is satisfied. For example, controller 108 may be adapted to deactivate heater 130 (1) when the second temperature is greater than or equal to a particular predetermined temperature, e.g., about 450° F. (about 232°) C., (2) when a difference between the second temperature and the first temperature is greater than or equal to a predetermined temperature difference, e.g., about 140° F. (about 60° C.), (3) when the first temperature is less than or equal to a further predetermined temperature, or (4) any combinations thereof. In an embodiment, controller 108 is adapted to deactivate heater 130 when any one of the predetermined conditions are satisfied.

Fryer 100 also may comprise means for indicating whether the means for heating, e.g., heater 130, has been deactivated, e.g., an indicator 122. Indicator 122 may be adapted to indicate to the user of fryer 100 that controller 108 has deactivated heater 130. For example, fryer 100 may comprise a display 114, and display 114 may be electrically coupled to controller 108. Moreover, display 114 may comprise indicator 122. Indicator 122 may comprise a visually perceivable device, e.g., a light emitting device, such as a light emitting diode, an audibly perceivable device, e.g., a sound generating device, such as at least one speaker, or both. As such, indicator 122 may be adapted to alert the user of fryer 100 that controller 108 has deactivated heater 130. Subsequently, if the amount of cooking medium 110 inside cooking vessel 140 is insufficient, the user of fryer 100 may add a sufficient amount of cooking medium 110 to cooking vessel 140, and controller 108 may reactivate heater 130.

In operation, heater 130 may heat cooking medium 110 to the cooking temperature. After cooking medium 110 reaches the cooking temperature, the food product may be placed inside cooking vessel 140, such that the food product may be cooked or heated in cooking medium 110. For example, the food product may be positioned inside a container, e.g., a wire basket, and cooked in cooking medium 110 for a predetermined amount of time sufficient to cook or heat the food product. The amount of time sufficient to cook or heat the food product at a given cooking temperature may depend on the type of food product which is cooked, and whether the food product is uncooked, partially cooked, or precooked. Moreover, cooking medium 110 may be used during several cooking cycles before cooking medium 110 inside cooking vessel 140 is replaced or is supplemented with a new or filtered cooking medium.

When cooking medium 110 inside cooking vessel 140 is used during several cooking cycles, level 110a of cooking medium 110 gradually may decrease. For example, a portion of cooking medium 110 may evaporate, may be absorbed by the food product, or may otherwise be lost from cooking vessel 140 during operation. As level 110a of cooking medium 110 decreases, first temperature sensor 118 and second temperature sensor 120 may determine, e.g., may substantially, continuously determine, the first temperature and the second temperature, respectively, and controller 108 may receive the first signal and the second signal from first temperature sensor 118 and second temperature sensor 120, respectively. Controller 108 may determine whether the temperature difference between the second temperature and the first temperature is greater than or equal to the predetermined temperature difference, e.g., about 140° F. (about 60° C.). For example, the second temperature may be greater than the first temperature. Controller 108 also may determine whether the second temperature is greater than or equal to the particular predetermined temperature, e.g., about 450° F. (about 232° C.), and whether the first temperature is less than or equal to the further predetermined temperature. In an embodiment of the present invention, if any of the predetermined conditions are satisfied, controller 108 deactivates heater 130. In another embodiment of the present invention, controller 108 deactivates heater 130 only if the particular temperature difference is greater than or equal to the predetermined temperature difference, or if the second temperature is greater than or equal to the particular predetermined temperature.

In any of the above-described embodiments of the present invention, when the at least one predetermined condition which resulted in the deactivation of heater 130 by controller 108 no longer is satisfied, controller 108 may reactivate heater 130. However, during a subsequent operation of fryer 100, the same predetermined condition which previously was satisfied, or a different predetermined condition, may be satisfied. As such, during operation of fryer 100, controller 108 may deactivate and reactivate heater 130 several times. Nevertheless, when at least one of the predetermined conditions are satisfied, and controller 108 deactivates heater 130, level 110a of cooking medium 110 still may be greater than a minimum level of cooking medium 110 sufficient to prevent damage to fryer 100. As such, in an embodiment of the present invention, indicator 122 may be activated when (1) at least one of the predetermined conditions is satisfied, and (2) a particular condition is satisfied. As such, in this embodiment, indicator 122 may not be activated each time controller 108 deactivates heater 130, e.g., indicator 122 may not be activated unless the particular condition also is satisfied. Moreover, the particular condition may be a condition which indicates an increased likelihood that level 110a of cooking medium 110 is less than or equal to the minimum level of cooking medium 110. For example, indicator 122 may indicate to the user of fryer 100 that controller 108 has deactivated heater 130 when at least one of the predetermined conditions have been satisfied a predetermined number times e.g., about three times, within a predetermined amount of time, e.g., about ten minutes. As such, isolated circumstances in which one or more of the predetermined conditions are satisfied, but during which level 110a of cooking medium 110 inside cooking vessel 140 is sufficient to avoid damaging fryer 100, may not result in activation of indicator 122.

In another example, indicator 122 may be activated when an amount of time between an initial or a first activation of heater 130 and a subsequent reactivation of heater 130 (after a deactivation of heater 130) is greater than a predetermined amount of time, e.g., between about 40 seconds and about 70 seconds. For example, after the initial or the first activation of heater 130, when the temperature of cooking medium 110 becomes about 200° F. (about 93° C.), and level 110a of cooking medium 110 is greater than the minimum level of cooking medium 110, at least one of the predetermined conditions may be satisfied, e.g., the temperature difference between the temperature of the at least one wall 102 and the temperature of cooking medium 110 may become greater than or equal to the predetermined temperature difference. When the temperature difference between the temperature of the at least one wall 102 and the temperature of cooking medium 110 becomes greater than or equal to the predetermined temperature difference, controller 108 may deactivate heater 130. Moreover, after controller 108 deactivates heater 130, the temperature difference between the temperature of the at least one wall 102 and the temperature of cooking medium 110 may fall below the predetermined temperature difference, and controller 108 subsequently may reactivate heater 130. Specifically, heat may be transferred from the at least one wall 102 to cooking medium 110, which may decrease the temperature difference between the temperature of the at least one wall 102 and the temperature of cooking medium 110. Based on the conductivity of cooking medium 110, the amount of time between the initial or the first activation of heater 130, and the subsequent reactivation of heater 130, may be about 30 seconds. Nevertheless, in this embodiment, as level 110a of cooking medium 110 approaches the minimum level of cooking medium 110, the amount of time between the initial activation of heater 130, and the subsequent reactivation of heater 130, may increase. Specifically, when level 110a of cooking medium 110 approaches the minimum level of cooking medium 110, and heater 130 is deactivated, heat may be transferred from the at least one wall 102 to the air inside cooking vessel 140. Nevertheless, because cooking medium 110 is a better conductor than air, heat more rapidly may be transferred from the at least one wall 102 to cooking medium 110 than from the at least one wall 102 to the air inside cooking vessel 140. Consequently, the amount of time which it takes for the temperature difference between the temperature of the at least one wall 102 and the temperature determined by first temperature sensor 118, e.g., the temperature of cooking medium 110 or the temperature air inside cooking vessel 140, depending on level 110a of cooking medium 100, to fall below the predetermined temperature difference, may increase as level 110a of cooking medium 110 decreases.

In a modification of this example, indicator 122 may be activated when the predetermined amount of time is exceeded a predetermined number of times over a predetermined number of activation and reactivation cycles of heater 130. For example, each time heater 130 is activated, then deactivated when at least one of the predetermined conditions is satisfied, and subsequently reactivated when the at least one predetermined condition which caused controller 108 to deactivate heater 130 no longer is satisfied, a cycle may be completed. Moreover, in this embodiment, indicator 122 may be activated when the predetermined amount of time is exceeded the predetermined number of times over the predetermined number of activation and reactivation cycles of heater 130. For example, indicator 122 may be activated when the predetermined amount of time is exceeded at least 50% of the time during the predetermined number of activation and reactivation cycles of heater 130, e.g., is exceeded during at least four activation and reactivation cycles of heater 130 out of seven activation and reactivation cycles of heater 130.

In another modification of this example, the predetermined amount of time for a first of the activation and reactivation cycles of heater 130 may be greater than the predetermined amount of time for subsequent activation and reactivation cycles of heater 130. For example, the predetermined amount of time for the first of the activation and reactivation cycles of heater 130 may be between about 120 seconds and about 180 seconds, and the predetermined amount of time for subsequent activation and reactivation cycles of heater 130 may be between about 40 seconds and about 70 seconds. Specifically, during the first activation and reactivation cycle of heater 130, the temperature of the at least one wall 102 may be lower than the temperature of the at least one wall 102 during subsequent activation and reactivation cycles of heater 130, e.g., fryer 100 may take a particular amount of time to warm up. Consequently, the amount of time sufficient to decrease the temperature difference between the temperature of the at least one wall 102 and the temperature of cooking medium 110 below the predetermined temperature difference, e.g., via heat transfer between the at least one wall 102 and cooking medium 110, may be greater during the first activation and reactivation cycle of heater 130 than during the subsequent activation and reactivation cycles of heater 130.

In yet another modification of this example, the determination of whether the predetermined amount of time is exceeded the predetermined number of times during the predetermined number of activation and reactivation cycles of heater 130 may start over when a further event occurs. For example, when the temperature of cooking medium 110 reaches a preset cooking temperature, the determination of whether the predetermined amount of time is exceeded the predetermined number of times during the predetermined number of activation and reactivation cycles of heater 130 may start over.

THEORY

While not wishing to be bound by a theory, it is believed that, in the embodiments depicted in FIGS. 1-5, the advantageous results of the invention are obtained because a relationship exists between the first temperature determined by first temperature sensor 118, the second temperature determined by second temperature sensor 120, the difference between the first temperature and the second temperature, and level 110a of cooking medium 110 inside cooking vessel 140. Moreover, this relationship may be analyzed to determine, e.g., indirectly determine, whether level 110a of cooking medium 110 inside cooking vessel 140 is sufficient to avoid damaging fryer 100. Specifically, when the temperature of cooking medium 110 is greater than the temperature of the air within cooking vessel 140, and level 110a of cooking medium 110 falls below first temperature sensor 118, the temperature determined by first temperature sensor 118 may be less than the temperature determined by first temperature sensor 118 when level 110a of cooking medium 110 is above or is substantially even with first temperature sensor 118. Similarly, when level 110a of cooking medium 110 falls below second temperature sensor 120, the temperature determined by second temperature sensor 120 may be greater than the temperature determined by second temperature sensor 120 when level 110a of cooking medium 110 is above or is substantially even with second temperature sensor 120. For example, cooking medium 110 may decrease the temperature of the at least one wall 102, and as level 110a of cooking medium 110 is lowered, heat more readily may be transferred to the at least one wall 102, which increases the temperature of the at least one wall 102. Thus, there may be an inverse relationship between the first temperature and the second temperature when level 110a of cooking medium 110 is lowered. Moreover, when the temperature of cooking medium 110 is greater than the temperature of the air within cooking vessel 140, when level 110a of cooking medium 110 inside cooking vessel 140 is positioned between first temperature sensor 118 and second temperature sensor 120, the temperature difference between the second temperature and the first temperature is greater than when level 110a of cooking medium 110 is above first temperature sensor 118 and second temperature sensor 120.

For each control mode of fryer 100, a minimum first temperature and a maximum second temperature may be associated with a minimum level of cooking medium 110 sufficient to prevent damage to fryer 100, and the minimum first temperature and the maximum second temperature may be empirically determined. Similarly, for each control mode of fryer 100, a maximum temperature differential between the second temperature and the first temperature may be associated with the minimum level of cooking medium 110, and the minimum temperature differential may be empirically determined. Nevertheless, fryer 100 may use several different control modes, and the temperature of cooking medium 110 may vary depending on the particular control mode currently used by fryer 100. Specifically, the temperature of cooking medium 110 may vary between the temperature of air within cooking vessel 140 and the cooking temperature. Consequently, the minimum first temperature, the maximum second temperature, and the maximum temperature differential associated with the minimum level of cooking medium 110 may be different for each of the various control modes of fryer 100.

Nevertheless, the minimum first temperature, the maximum second temperature, and the maximum temperature differential may be selected, such that regardless of the control mode currently used by fryer 100, when level 110a of cooking medium 110 is at or falls below the minimum level of cooking medium 110, at least one event occurs. Specifically, when level 110a of cooking medium 110 is at or falls below the minimum level of cooking medium 110, the first temperature is less than or equal to the minimum first temperature, the second temperature is greater than or equal to the minimum second temperature, or the temperature differential between the second temperature and the first temperature is greater than or equal to the maximum temperature differential. Although more than one of these events may occur, in an embodiment, the occurrence of any of these events may trigger controller 108 to deactivate heater 130. Consequently, a single minimum first temperature, a single maximum second temperature, and a single maximum temperature differential, may be selected and used for all of the control modes of fryer 100, e.g., controller 108 may employ a single control regime. Moreover, because at least one of these events occurs during each control mode of fryer 100, it may not be necessary for fryer 100 to employ a separate melt control mode, which reduces the number of control modes from which the user must select when operating fryer 100.

Figure 6:
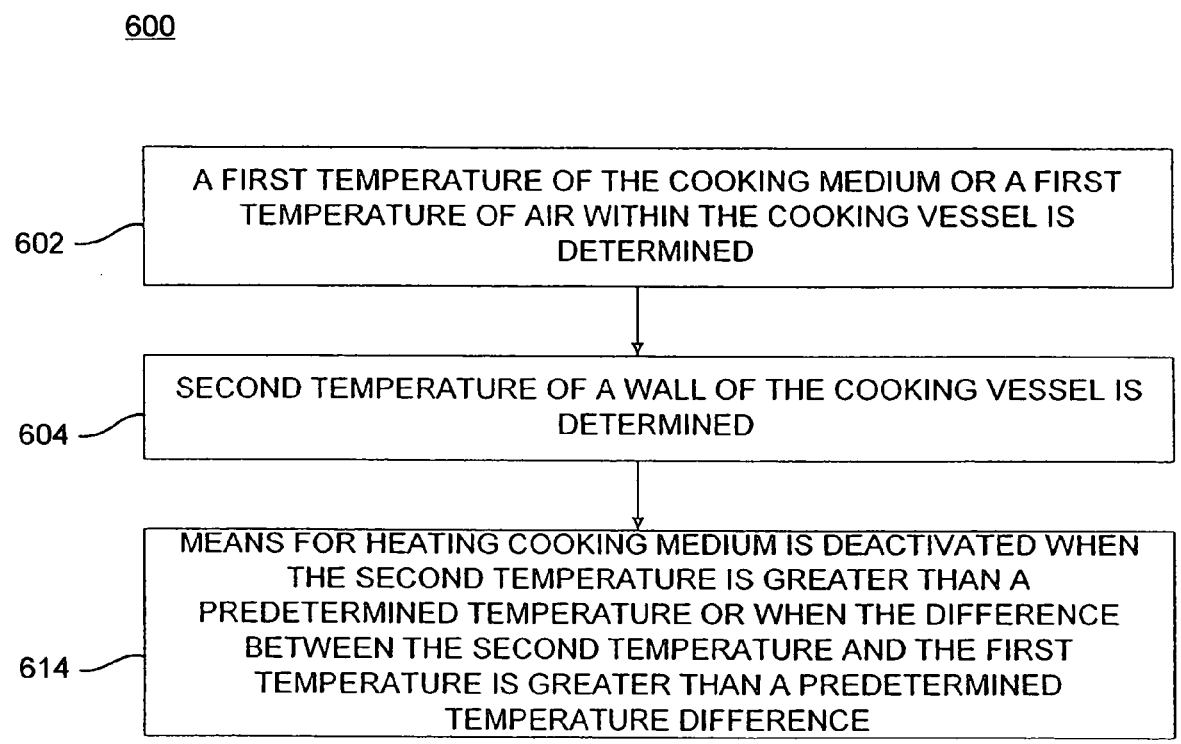
FIG. 6 is a flow chart of a method for deactivating a fryer when a level of a cooking medium in the fryer falls below a predetermined level, according to an embodiment of the present invention.

Referring to FIG. 6, a method 600 for deactivating a fryer, e.g., fryer 100, when a level of a cooking medium, e.g., cooking medium 110, inside a cooking vessel, e.g., cooking vessel 140, falls below a predetermined level, according to an embodiment of the present invention, is depicted. In step 602, a first temperature is determined, e.g., by first temperature sensor 118, and in step 604, a second temperature is determined, e.g., by second temperature sensor 120. For example, the first temperature may be a temperature of the cooking medium or a temperature of air within the cooking vessel, depending on the level of the cooking medium, and the second temperature may be a temperature of at least one wall, e.g., at least one wall 102. Moreover, in step 606, a means for heating the cooking medium, e.g., heater 130, is deactivated (1) when the second temperature is greater than a predetermined temperature, e.g., about 450° F. (about 232° C.), (2) when the difference between the second temperature and the first temperature is greater than a predetermined temperature difference, e.g., about 140° F. (about 60° C.), or both. In a modification of this embodiment, in step 606, indication also is given to a user of the fryer that the means for heating has been deactivated.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:

1. A fryer, comprising:
a cooking vessel configured to contain a cooking medium, wherein the cooking vessel comprises at least one wall;
means for heating the cooking medium;
a first temperature sensor which determines a first temperature and generates a first signal indicating the first temperature, wherein the first temperature is a temperature of the cooking medium or a temperature of air within the cooking vessel;
a second temperature sensor which determines a second temperature of the at least one wall and generates a second signal indicating the second temperature; and
means for selectively activating and deactivating the means for heating, based at least on the second temperature, wherein the means for activating and deactivating is electrically coupled to the first temperature sensor and to the second temperature sensor, wherein the means for activating and deactivating receives the first signal, receives the second signal, and deactivates the means for heating when at least one predetermined condition is satisfied, wherein the means for selectively activating and deactivating compares the first signal to the second signal to determine a difference between the first temperature and the second temperature and compares the second temperature or the temperature difference to a predetermined temperature and the at least one predetermined condition is at least one condition selected from the group consisting of:
the second temperature is greater than or equal to the particular predetermined temperature; and
the temperature difference between the second temperature and the first temperature is greater than or equal to a predetermined temperature difference.

2. The fryer of claim 1, wherein the means for selectively activating and deactivating also deactivates the means for heating when the first temperature is less than or equal to a further predetermined temperature.

3. The fryer of claim 2, wherein the particular predetermined temperature is greater than the further predetermined temperature.

4. The fryer of claim 3, wherein the particular predetermined temperature is about 232° C.

5. The fryer of claim 1, wherein the predetermined temperature difference is about 78° C.

6. The fryer of claim 1, wherein the means for heating comprises a heater, and the heater comprises a gas burner.

7. The fryer of claim 1, wherein the means for heating comprises a heater, and the heater comprises an electric heating element.

8. The fryer of claim 7, wherein the electric heating element comprises at least one heating coil.

9. The fryer of claim 1, wherein the cooking medium comprises at least one medium selected from the group consisting of an oil, a liquid shortening, and a meltable-solid shortening.

10. The fryer of claim 1, wherein the first temperature sensor is affixed to the at least one wall, and the second temperature sensor is affixed to the at least one wall.

11. The fryer of claim 10, wherein the first temperature sensor is positioned above the second temperature sensor.

12. The fryer of claim 1, wherein the first temperature sensor is affixed to the at least one wall, and the second temperature sensor is affixed to the means for heating the cooking medium.

13. The fryer of claim 12, wherein the first temperature sensor is positioned above the second temperature sensor.

14. The fryer of claim 1, further comprising means for indicating whether the means for heating has been deactivated.

15. The fryer of claim 14, wherein the means for indicating comprises a visually perceivable device.

16. The fryer of claim 15, wherein the visually perceivable device comprises a light emitting device.

17. The fryer of claim 14, wherein the means for indicating comprises an audibly perceivable device.

18. The fryer of claim 14, wherein the means for selectively activating and deactivating further comprises means for measuring an amount of time and for counting the number of times that the at least one predetermined condition is satisfied and the means for indicating is activated when the at least one predetermined condition is satisfied a predetermined number of times within a predetermined amount of time.

19. The fryer of claim 18, wherein the predetermined number of times is about three times, and the predetermined amount of time is about ten minutes.

20. The fryer of claim 14, wherein the means for selectively activating and deactivating further comprises means for measuring an activation and reactivation cycle time between an activation and a subsequent reactivation of the means for heating after a deactivation of the means for heating and the means for indicating is activated when an amount of time between the activation of the means for heating and the subsequent reactivation of the means for heating is greater than a predetermined amount of time.

21. The fryer of claim 20, wherein the predetermined amount of time is between about 40 seconds and about 70 seconds.

22. The fryer of claim 14, wherein the means for selectively activating and deactivating further comprises means for measuring an activation and reactivation cycle time between an activation and a subsequent reactivation of the means for heating after a deactivation of the means for heating and the means for indicating is activated when during a predetermined number of activation and reactivation cycles, a predetermined amount of time is exceeded a predetermined number of times.

* * * * *